(12) United States Patent
Lee et al.

(10) Patent No.: US 8,553,545 B2
(45) Date of Patent: Oct. 8, 2013

(54) CONGESTION BUFFER CONTROL IN WIRELESS NETWORKS

(75) Inventors: Jay J. Lee, San Ramon, CA (US);
Deepak Kakadia, Union City, CA (US);
Thomas Tan, San Jose, CA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 439 days.

(21) Appl. No.: 12/820,211

(22) Filed: Jun. 22, 2010

(65) Prior Publication Data
US 2011/0310738 A1     Dec. 22, 2011

(51) Int. Cl.
*H04L 12/26* (2006.01)

(52) U.S. Cl.
USPC .................... 370/232; 370/401; 370/417

(58) Field of Classification Search
None
See application file for complete search history.

(56) References Cited

U.S. PATENT DOCUMENTS

| | | | | |
|---|---|---|---|---|
| 6,091,709 A | * | 7/2000 | Harrison et al. | 370/235 |
| 6,144,640 A | * | 11/2000 | Simpson et al. | 370/236 |
| 7,706,255 B1 | * | 4/2010 | Kondrat et al. | 370/219 |
| 2003/0103500 A1 | * | 6/2003 | Menon et al. | 370/389 |
| 2006/0277280 A1 | * | 12/2006 | Craggs | 709/220 |
| 2007/0076604 A1 | * | 4/2007 | Litwack | 370/230 |
| 2007/0183416 A1 | * | 8/2007 | Gooch et al. | 370/389 |
| 2009/0219937 A1 | * | 9/2009 | Liu et al. | 370/392 |
| 2009/0245104 A1 | * | 10/2009 | Nishimura et al. | 370/230 |

* cited by examiner

*Primary Examiner* — Gregory Sefcheck
*Assistant Examiner* — Joshua Smith

(57) ABSTRACT

A network device may handle packet congestion in a network. In one implementation, the network device may receive a packet associated with a quality of service priority class and with a connection to a user device. The network device may include an output queue associated with the priority class of the packet. The output queue may be congested. The network device may determine whether the connection associated with the packet is a guaranteed bit rate connection. The network device may queue the packet according to a first action policy function when the connection associated with the packet is a guaranteed bit rate connection and may queue the packet according to a second action policy function when the connection associated with the packet is not a guaranteed bit rate connection.

20 Claims, 7 Drawing Sheets

CONGESTION BUFFER CONTROL IN WIRELESS NETWORKS

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

In real networks, bandwidth is limited. For a variety of reasons, traffic in the network can become congested. When network congestion occurs, buffers at network nodes can become full, resulting in the dropping of data, such as data packets. Dropping packets in response to full buffers can adversely affect applications using the network.

DETAILED DESCRIPTION

The following detailed description refers to the accompanying drawings. The same reference numbers in different drawings may identify the same or similar elements. Also, the following detailed description does not limit the invention.

Implementations described herein may include techniques for handling packet congestion in a network. A congestion control device may minimize packet delay and packet loss in a congested network. The network may particularly include a wireless network. In one implementation, the congestion control device may take into account a number of factors, such as application type, priority levels, maximum data rates, guaranteed data rates, aggregate data rate per user, and/or other factors, when deciding how to handle network congestion. Based on these factors, the congestion control device may determine that a packet is to be dropped, transmitted, or delayed (or various combinations of these actions).

Figure 1:
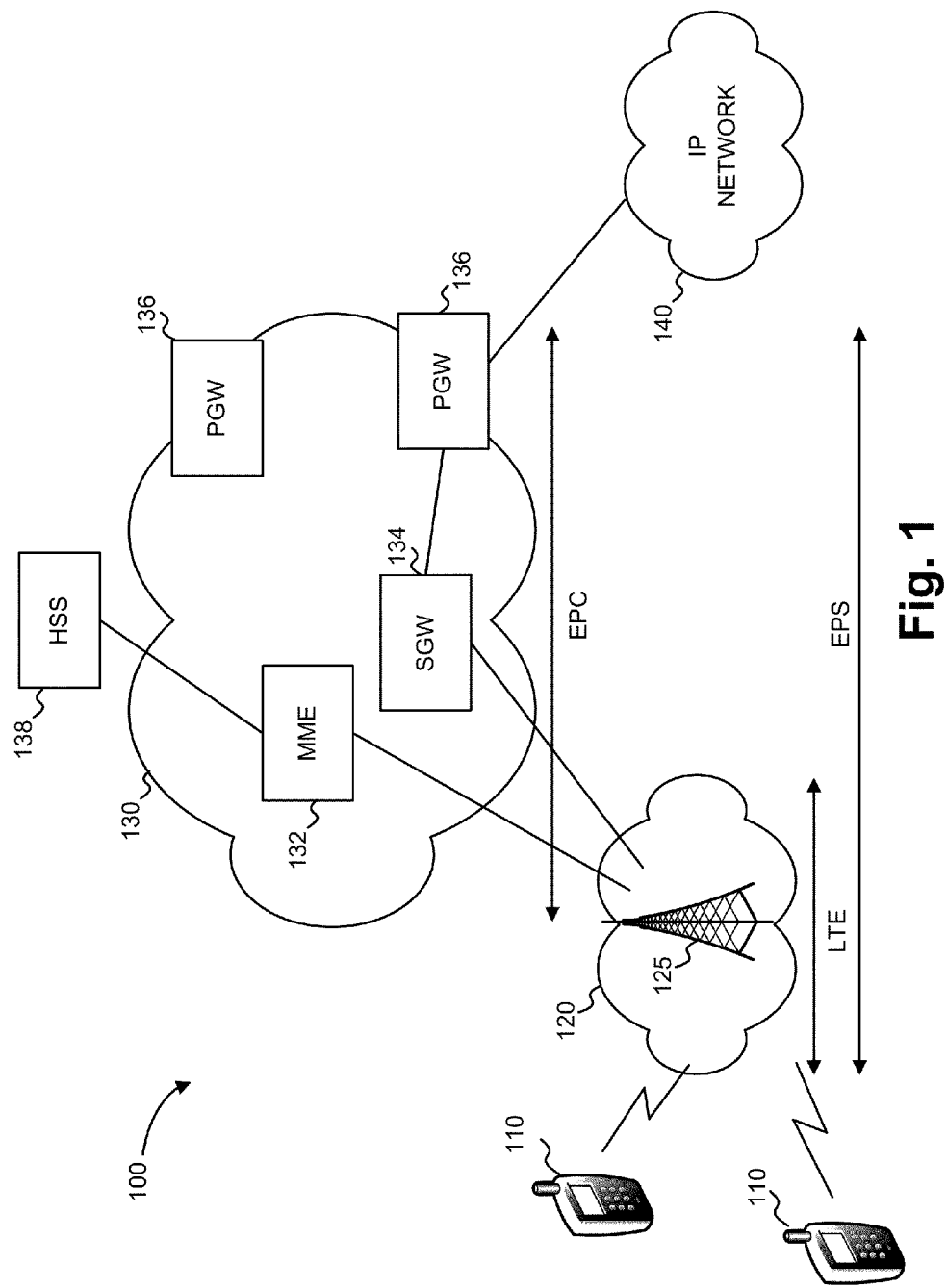
FIG. 1 is a diagram illustrating an example system.

FIG. 1 is a diagram illustrating an example system 100. System 100 may generally illustrate a wireless communication system that implements the evolved packet system (EPS) that includes a wireless access network based on the long term evolution (LTE) standard and a core network based on the evolved packet core (EPC) standard. In alternative implementations, other communication standards could be used.

As shown in FIG. 1, system 100 may include one or more client devices 110, called user equipment (UE) devices 110 herein, that connect to a wireless access network 120. Wireless access network 120 may connect to a core network 130. Wireless access network 120 and core network 130 may be networks that are implemented by a single entity, such as a wireless service provider, to provide wireless telecommunication services to UE devices 110. Core network 130 may further connect to additional networks, such as Internet Protocol (IP) based network 140. In one implementation, wireless access network 120 may implement the LTE standard and core network 130 may implement the EPC standard.

UE devices 110 may generally include devices designed to communicate with wireless access network 120. UE devices 110 may include, for example, mobile telephones, smart phones, electronic notepads, laptops, and/or personal digital assistants (PDAs). UE devices 110 may establish wireless communication sessions with wireless access network 120. The wireless communication sessions may be used for voice (e.g., telephone calls) or data sessions.

Wireless access network 120 may include one or more nodes (eNB) 125. Each eNB 125 may include antennas and related transceiver circuitry for connecting to UE devices 110. eNB 125 may further connect the UE devices 110 to core network 130. An eNB 125 may combine the functionality of base stations and radio access controllers in radio access networks of the earlier network standards 2G and 3G.

Although wireless network 120 and core network 130 may be referred to as implementing a "wireless network," it can be appreciated that this refers to the wireless connectivity of UE devices 110. Individual components within wireless network 120 and core network 130 may be connected with "wired" or "wireless" connections.

Core network 130 may include an IP packet-switched network that includes network devices that provide the "intelligence" for telecommunication services provided to UE devices 110. Core network 130 may include one or more mobility management entities (MMEs) 132, serving gateways (SGW) 134, and packet data network gateways (PGW) 136. MME 132 may connect to a home subscriber server (HSS) 138.

MME 132 may implement control plane processing for core network 130. For example, MME 132 may select a particular SGW 134 for a particular UE device 110, may implement tracking and paging procedures for UE devices 110, may activate and deactivate bearers for UE devices 110, and may interface to non-LTE radio access networks.

SGW 134 may perform signalling conversion between the transport used in wireless access network 120 and the IP-based transport used within core network 130. More specifically, SGW 134 may provide an access point to and from UE devices 110 and may handle forwarding of data packets for UE devices 110 and act as a local anchor point during handover procedures between eNB 125. MME 132 may interface with SGW 134.

PGW 136 may function as a gateway to IP networks, such as IP network 140. A particular UE device 110, while connected to a single SGW 134, may be connected to multiple PGWs 136, one for each IP network with which UE device 110 communicates.

HSS 138 may implement a master user database that supports the network entities that handle calls. HSS 138 may store subscription-related information (subscriber profiles), may perform authentication and authorization of the user, and may provide information about the subscriber's location and IP information.

IP network 140 may be an external packet-based network, such as public or private network. IP network 140 may represent, for example, the Internet.

FIG. 1 shows an example of components that may be included in a system 100. In other implementations, system 100 may include fewer, different, differently arranged, or additional components than depicted in FIG. 1. In still other implementations, one or more components of system 100 may perform one or more tasks described as being performed by one or more other components of system 100.

Figure 2:
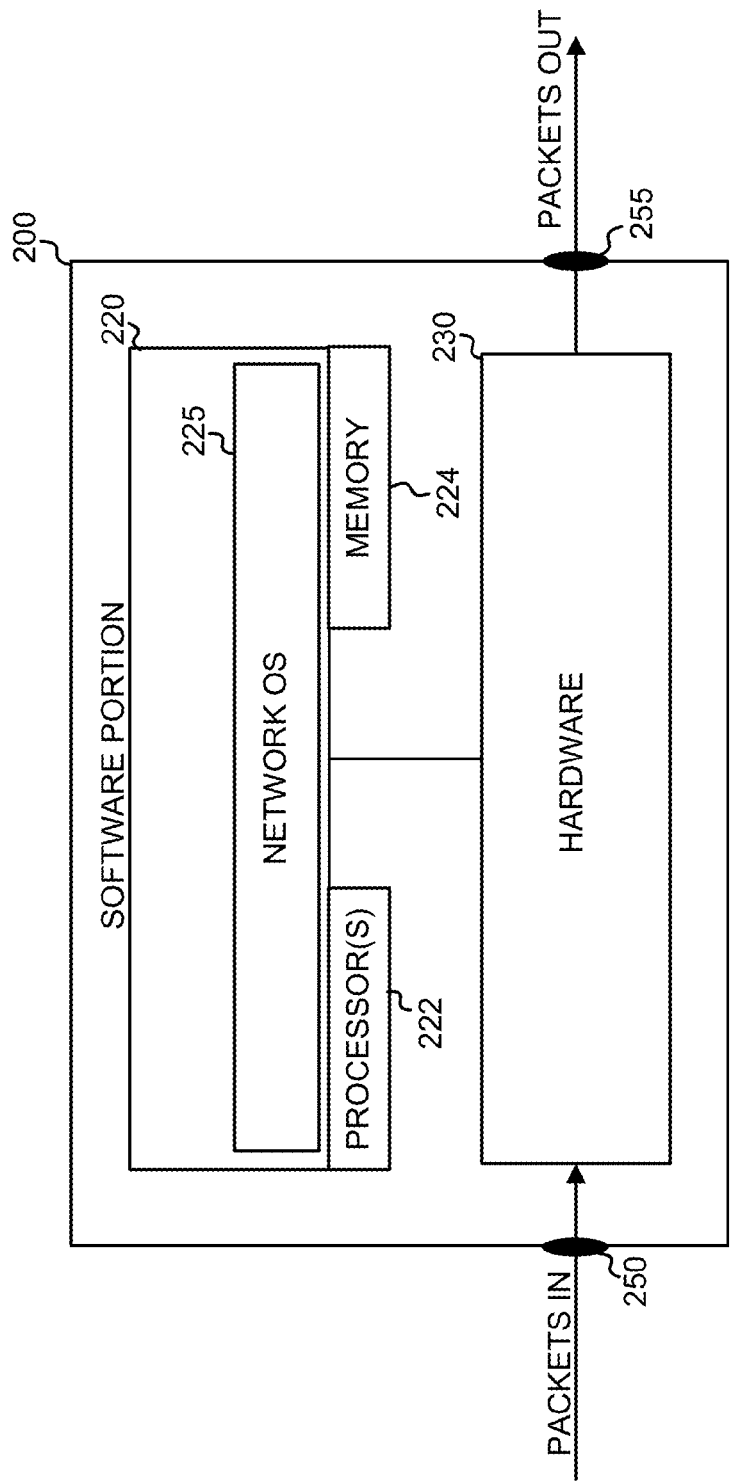
FIG. 2 is a block diagram of an example network device in the system shown in FIG. 1.

FIG. 2 is an example of components that may be included in a network device 200, which may correspond to one of the devices in core network 130, such as MME 132, SGW 134, or PGW 136. Alternatively, network device 200 may correspond to another device in core network 130, such as a router or switch (not shown in FIG. 1) used to route packets through core network 130, or to a network device outside of core network 130, such as eNB 125. In order to increase throughput, network device 200 may use dedicated hardware to assist in processing incoming packets. In some alternative implementations, units of data (data units) other than packets may be used. As shown in FIG. 2, network device 200 may generally include a software portion 220 and a hardware portion 230.

Software portion 220 may include software designed to control network device 200. Software portion 220 may particularly include network operating system (OS) 225. For example, network operating system 225 may control hardware portion 230 and may provide an interface for user configuration of network device 200. In general, software portion 220 may implement the functions of network device 200 that are not time critical. The functions described as being performed by software portion 220, may be implemented through, for example, one or more general purpose processors 222 and one or more memories 224. Processors 222 may include processors, microprocessors, and/or other types of processing logic that may interpret and execute instructions. Memories 224 (also referred to as computer-readable media herein) may include random access memories (RAMs), read-only memories (ROMs), and/or other types of dynamic or static storage devices that may store information and instructions for execution by one or more processors 222.

Hardware portion 230 may include circuitry for efficiently processing packets received by network device 200. Hardware portion 230 may include, for example, logic, such as an application specific integrated circuit (ASIC), a field programmable gate array (FPGA), and/or a content-addressable memory (CAM). Hardware portion 230 may, for example, receive incoming packets, extract header information for the packets, and process the packets based on the extracted header information.

Network device 200 may additionally include one or more input ports 250 for receiving incoming packets and one or more output ports 255 for transmitting outgoing packets. In some implementations, a port may act as both or one of an input port 250 or an output port 255. Ports 250/255 may also be used to receive remote user connections for configuring the operation of network device 200.

Although network device 200 is shown as including a software portion 220 and a hardware portion 230, network device 200 may, in some implementations, be implemented entirely through hardware. Additionally, network device 200 may include additional, fewer, different, or differently arranged components than those illustrated. Further, in some implementations, network device 200 may be implemented as a general purpose computer.

Consistent with aspects described herein, network device 200 may police the traffic flow received by network device 200. In one aspect, the traffic policing may be performed at the boundary of core network 130. This may be desirable because, if more traffic is allowed into core network 130 than what core network 130 is provisioned to handle, the increased traffic load may cause network congestion and degradation in network performance. Such degradation in the network may make it impossible to deliver the desired quality of service (QoS) for all the network traffic. In general, traffic policing may be defined as the process of monitoring network traffic for compliance with a traffic contract or service level agreement (SLA) and taking steps to enforce that contract.

Figure 3:
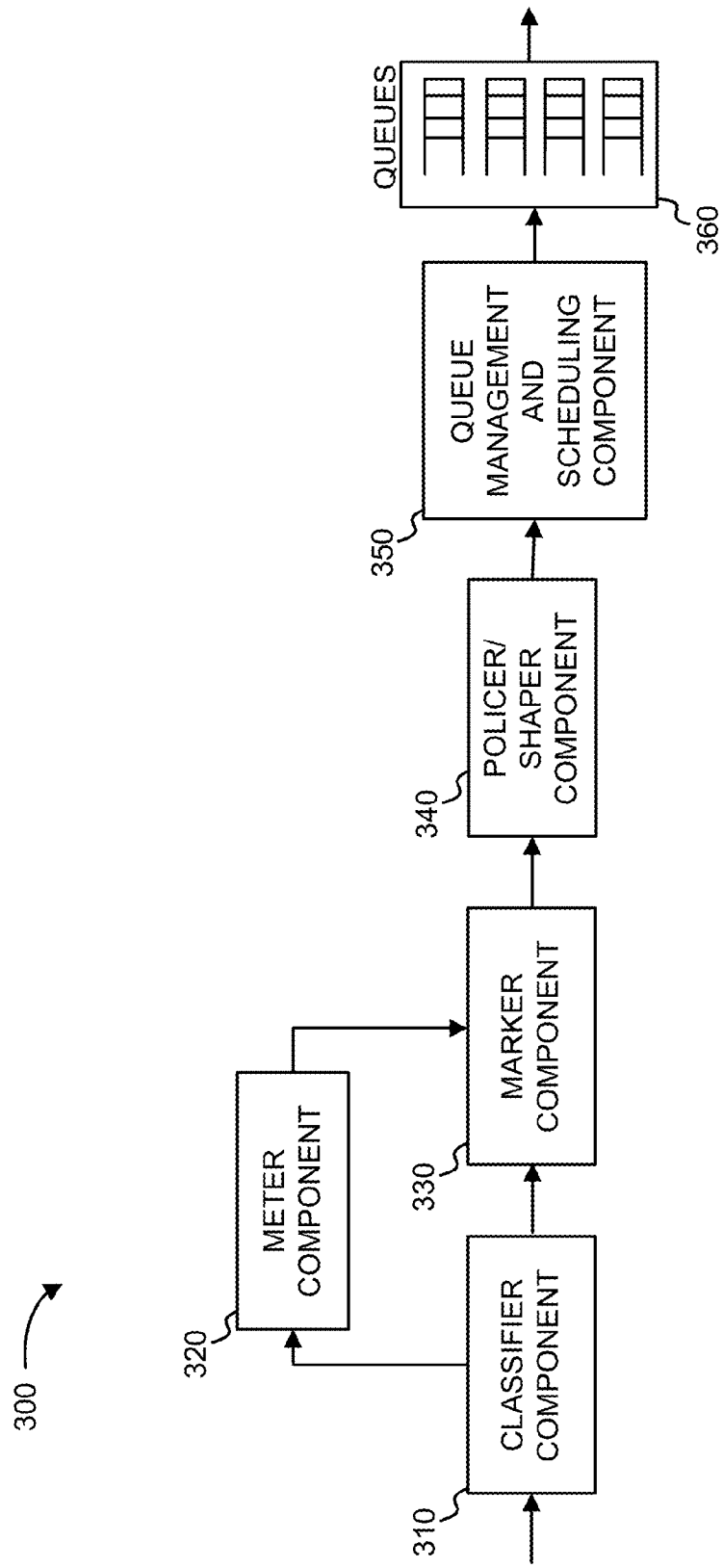
FIG. 3 is a diagram illustrating an example of functional components in a network device of FIG. 2.

FIG. 3 is a diagram illustrating an example of functional components 300 in network device 200. Functional components 300 may particularly include components to perform traffic policing and buffering. The functional components illustrated in FIG. 3 may be implemented, for example, by one or more of the components of network device 200 illustrated in FIG. 2. Functional components 300 may include classifier component 310, meter component 320, marker component 330, policer/shaper component 340, queue management and scheduling component 350, and queues 360.

Classifier component 310 may operate to separate incoming IP packets into different traffic classes. The class separation may be based on information in the header of the packet to place each data packet into a limited number of traffic classes. Each traffic class can be managed differently, ensuring preferential treatment for higher-priority traffic on the network.

Meter component 320 may measure the rate (e.g., the instantaneous bandwidth or bit rate) of incoming traffic. Traffic may be measured on a per-connection or per-traffic class basis. The output of meter component 320 may be input to marker component 330, and potentially also used by policer/shaper component 340 and queue management and scheduling component 350. The traffic measurements taken by meter component 320 may be used to determine whether a connection conforms to or exceeds the service level agreement.

Marker component 330 may operate to update or modify packet header data, or other information, to indicate a particular class to which a packet belongs. For example, when using the DiffSery protocol, marker component 330 may write/rewrite the Differentiated Service Code Point (DSCP) field of a packet's header to indicate to which class this packet belongs. In an EPS system, for example, there may be up to nine QoS classes, indexed by a classification index that has values from one (highest priority) to nine (lowest priority). Policer/shaper component 340 may monitor input network traffic for compliance with traffic contracts. Policer/shaper component 340 may enforce the traffic contracts. Policer/shaper component 340 may use the rate measurements determined by meter component 320 when enforcing traffic contracts. Enforcing the traffic contracts may include, when acting as a policer, dropping certain packets. Enforcing the traffic contracts may include, when acting as a shaper, buffering certain packets so that the packet flow will comply with the profile included in the traffic contract.

Queue management and scheduling component 350 may manage the assignment of packets to various ones of queues 360. Packets may be placed in queues 360 based on, for example, the class of the packet. Queue management and scheduling component 350 may determine the bandwidth allotted to each one of queues 360.

Queues 360 may include, for example, a number of first-in-first-out (FIFO) queues that buffer packets before transmission from network device 200. Each queue in queues 360 may be used to buffer the packets for a particular traffic class or stream. Different queues may be allotted different transmission bandwidths by queue management and scheduling component 350. In this manner, different classes of packets may be treated with different priorities.

Techniques are known for determining when a traffic flow violates a traffic contract or SLA. For example, token bucket techniques are commonly used in networks.

An action policy function (APF) may be used to determine what should be done with traffic flows or data connections violating the traffic contract or SLA. In some implementations, APF can be implemented without using a traffic policing function. For instance, the APF may be applied whenever a network buffer is fill. In its simplest form, APF may have two action policies: transmit and drop. That is, if the traffic flow is compliant with the traffic contract, the APF may transmit the traffic. On the other hand, if the traffic flow violates the traffic contract, the APF may drop the traffic.

Consistent with aspects described herein, network device 200 may implement an APF that is particularly suited to handling buffer congestion in a wireless network. This APF will now be more particularly described with references to FIGS. 4-7.

Figure 4:
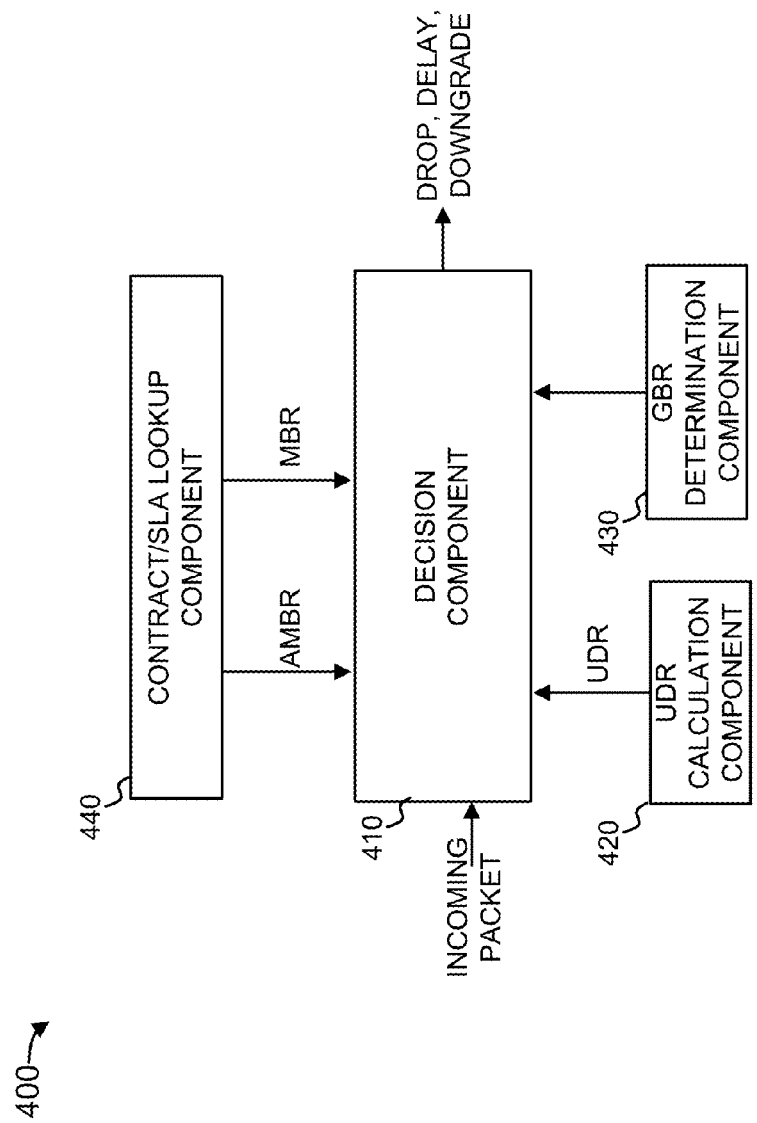
FIG. 4 is a diagram illustrating an example of functional components for implementing an action policy function.

FIG. 4 is a diagram illustrating an example of functional components 400 that may be used for implementing an APF. The APF implemented by functional components 400 may be implemented, for example, by queue management and scheduling component 350. The APF may act as a congestion control mechanism that controls the buffering implemented by queues 360 during times of congestion.

Functional components 400 may include decision component 410, usage data rate (UDR) calculation component 420, guaranteed bit-rate (GBR) determination component 430, and contract/SLA lookup component 440. Decision component 410 may operate on incoming packets that are associated with a connection that is in a congestion state (e.g., the queue corresponding to the packet is full). Based on the outputs of UDR calculation component 420, GBR determination component 430, and contract/SLA lookup component 440, decision component 410 may determine whether to drop, delay, or downgrade the incoming packet. Dropping a packet refers to discarding the packet. Delaying a packet, as used herein, refers to temporarily storing the packet for a certain time period to determine if resources become available. Downgrading a packet, as used herein, refers to changing the priority class of the packet so that the packet is associated with another (potentially non-congested) one of queues 360.

UDR calculation component 420 may determine the usage data rate for a connection. A connection may refer to a traffic stream or channel. A single UE device 110 may form multiple connections. For example, a UE device 110 may simultaneously implement a voice-based application and an email application. Each application may form a separate connection. Packets within a connection may be associated with a single traffic class or, in some implementations, the application may use a connection that uses different traffic classes. UDR calculation component 420 may use the output of meter component 320 in determining the UDR for the connection.

GBR determination component 430 may determine whether connections are guaranteed bit rate (GBR) connections. A GBR connection may refer to a connection that is formed by an application that is sensitive to bit-rate changes below a minimum level. For GBR connections, the connection is promised a minimum guaranteed bit rate. For example, voice applications may be applications that use GBR connections because if the connection falls below a certain level, the quality of the call may degrade. Other applications, such as file transfer applications, may be less sensitive to a minimum bit rate level. The connections associated with these applications will be referred to as non-GBR connections herein. GBR connections may be connected in system 100 using dedicated bearer connections. Non-GBR connections may be connected in system 100 using default bearer connections.

Contract/SLA lookup component 440 may provide contract/SLA specific parameters to decision component 410. As shown, the maximum bit rate (MBR) allowed per connection may particularly be provided by contract/SLA lookup component 440. The MBR for a connection may be determined by the network provider based on the particular network contract or SLA associated with the connection. For example, all connections from a particular user or class of user may be associated with a predetermined MBR. Contract/SLA lookup component 440 may also provide an aggregate MBR (AMBR) value, which may specify the maximum total bit rate that is to be provided for a particular UE device 110.

As mentioned, based on the outputs of UDR calculation component 420, GBR determination component 430, and contract/SLA lookup component 440, decision component 410 may determine whether to drop, delay, or downgrade the incoming packet. In this manner, decision component 410 implements an APF.

Figure 5:
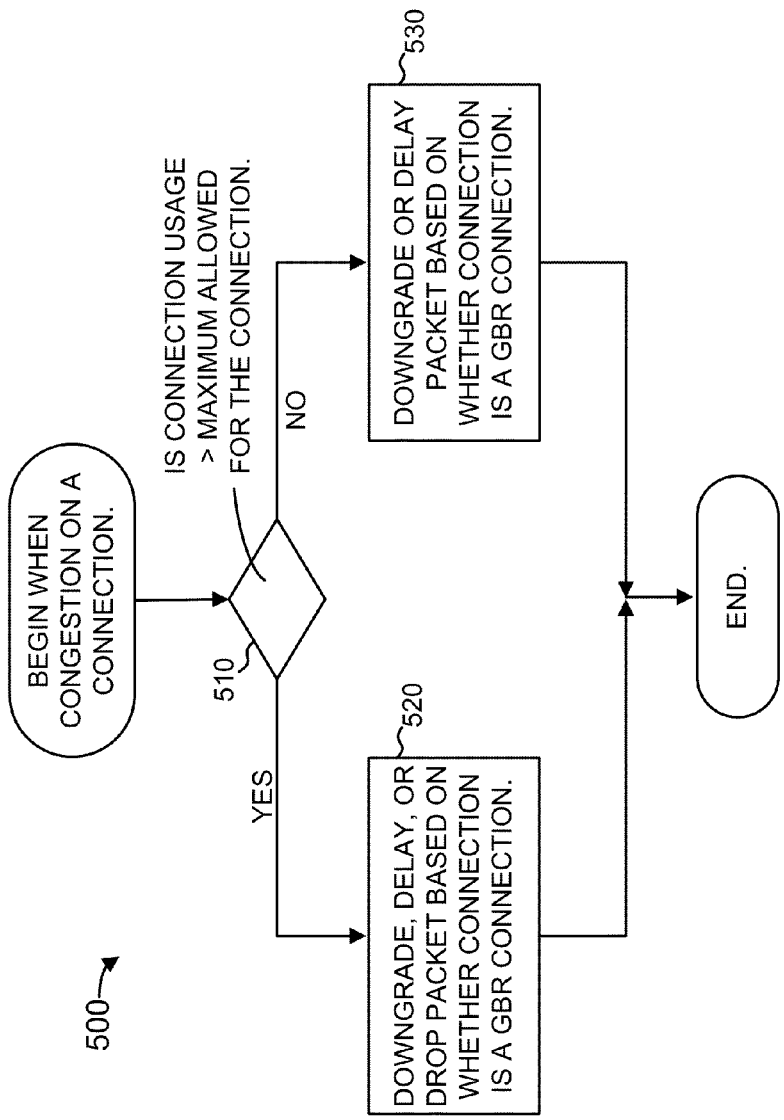
FIG. 5 is a flow chart illustrating an example process corresponding to an action policy function.

FIG. 5 is a flow chart illustrating an example process 500 corresponding to the APF implemented by decision component 410. The implemented APF may be particularly suited for controlling congestion in a wireless network. Process 500 may be implemented, for example, by network device 200 using functional components 400. Process 500 may be performed in response to congestion for a connection (e.g., when one of queues 360 is overflowing).

Process 500 may include determining, for the congested connection, whether the usage of the connection is greater than the maximum allowed for the connection (block 510). In one implementation, the "usage" of a connection may correspond to the usage data rate (e.g., instantaneous bit rate) of the connection, as determined by UDR calculation component 420. The maximum allowed rate for the connection, i.e., the MBR for the connection, may be looked-up from contract/SLA lookup component 440. The MBR for a connection may be, for example, set by the network provider to a certain value for all connections of a client.

When the usage of the connection (UDR) is greater than the maximum allowed for the connection, (block 510-YES), process 500 may further include downgrading, delaying, or dropping the packet (block 520). Whether to downgrade, delay, or drop the packet may be determined at least based on whether the connection is a GBR connection (block 520). Whether a connection is a GBR connection may be determined by GBR determination component 430.

The operation of block 520 will be described in more detail below with reference to FIG. 6.

When the usage of the connection is not greater than the maximum allowed for the connection, (block 510-NO), process 500 may further include downgrading or delaying the packet (block 530). In this situation, the connection is congested but the connection is still below the maximum allowed bit rate. Whether to downgrade or delay the packet may be determined at least based on whether the connection is a GBR connection (block 530).

The operation of block 530 will be described in more detail below with reference to FIG. 7.

Figure 6:
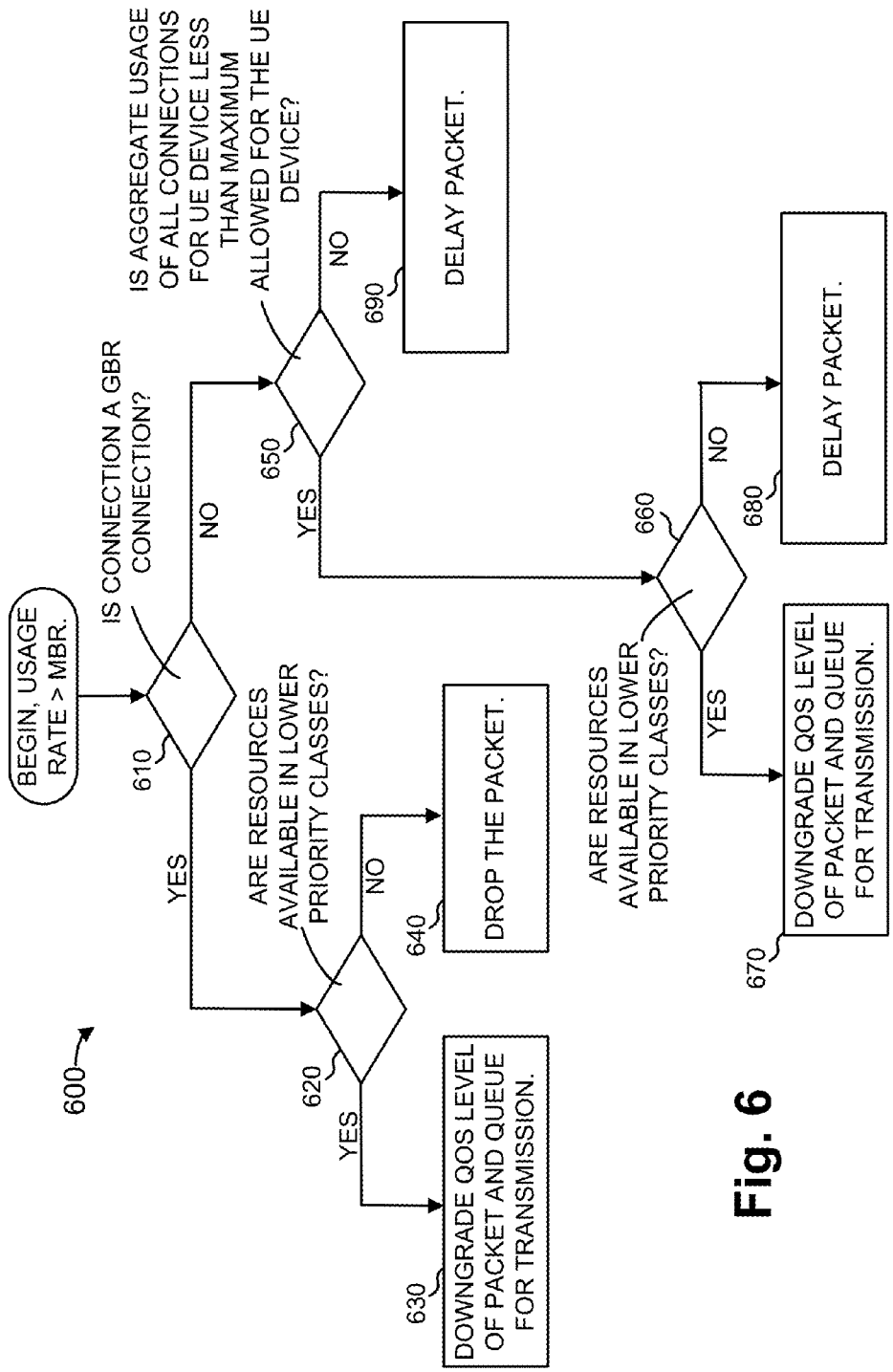
FIGS. 6 and 7 are flow charts illustrating an example process for downgrading, dropping, or delaying a packet.

FIG. 6 is a flow chart illustrating an example process 600 for downgrading, dropping, or delaying a packet, as performed in block 520 (FIG. 5). Process 600 may be implemented, for example, by network device 200 using functional components 400.

Process 600 may include determining whether the connection is a GBR connection (block 610). As previously mentioned, a GBR connection may be a connection that is formed by an application that is sensitive to bit-rate changes below a minimum level. Whether a connection is a GBR connection may be determined by GBR determination component 430.

If the connection is a GBR connection (block 610-YES), process 600 may determine whether resources are available in lower priority classes (block 620). Queues 360 may be filled according to priority class of the packets. For example, each queue in queues 360 may store packets of a single priority class. Under EPS, for example, packets may be classified into one of nine different classes, in which lower class values have higher priority (i.e., class one may have the highest priority and class nine the lowest priority).

When resources are determined to not be available for a lower priority class (block 620-NO), process 600 may include dropping the packet (block 640). Downgrading the QoS priority class level may include changing the DiffServ priority field of the packet to reflect a lower priority class. In this situation, although the usage rate for the connection is greater than the allowed maximum, the packet may still be transmitted, although from a lower priority queue than it normally would.

When resources are determined to not be available for a lower priority class (block 620-NO), process 600 may include dropping the packet (block 640).

Referring back to block 610, the packet may be determined to be a packet for a non-GBR connection (block 610-NO). In this situation, process 600 may include determining if the aggregate usage of all the connections for the UE device is less than the maximum allowed (block 650). The aggregate usage of all the connections for the UE device may be the sum of the current usage of each connection for the UE device. The maximum allowed usage for a UE device 110 (AMBR) may be received from contract/SLA lookup component 440.

In some implementations, the determination of the aggregate usage of all the connections for the UE device may be performed on a per-priority class basis. In this case, the AMBR may also be specified on a per-priority class basis.

When the aggregate usage of all the connections for the UE device is less than the maximum allowed (block 650-YES), process 600 may include determining whether resources are available in lower priority classes (block 660). The determination made in block 660 may be similar to the determination made in block 620. For instance, decision component 410 may examine queues 360 corresponding to lower priority classes than the class of the packet under consideration. When resources are available, (block 660-YES), process 600 may include downgrading the priority class level of the packet and queuing the packet to one of queues 360 based on the new priority class (block 670). Otherwise (block 660-NO), the packet may be delayed (block 680).

In one implementation, delaying the packet, as performed in block 680, may include holding the packet for a certain maximum delay interval. If resources become available during the delay interval, the packet may be queued for transmission. If resources do not become available during the delay interval, other actions may be taken, such as dropping the packet. A "resource becoming available" may refer to a queue in queues 360, corresponding to the packet's current class or lower, ceasing to be congested.

Referring back to block 650, when the aggregate usage of all the connections for the UE device is not less than the maximum allowed (block 650-NO), the packet may be delayed (block 690). Delaying the packet, as performed in block 690, may be performed similarly to the delay of the packet performed in block 680. That is, the packet may be held for a certain maximum delay interval. If resources become available during the delay interval, the packet may be queued for transmission.

Figure 7:
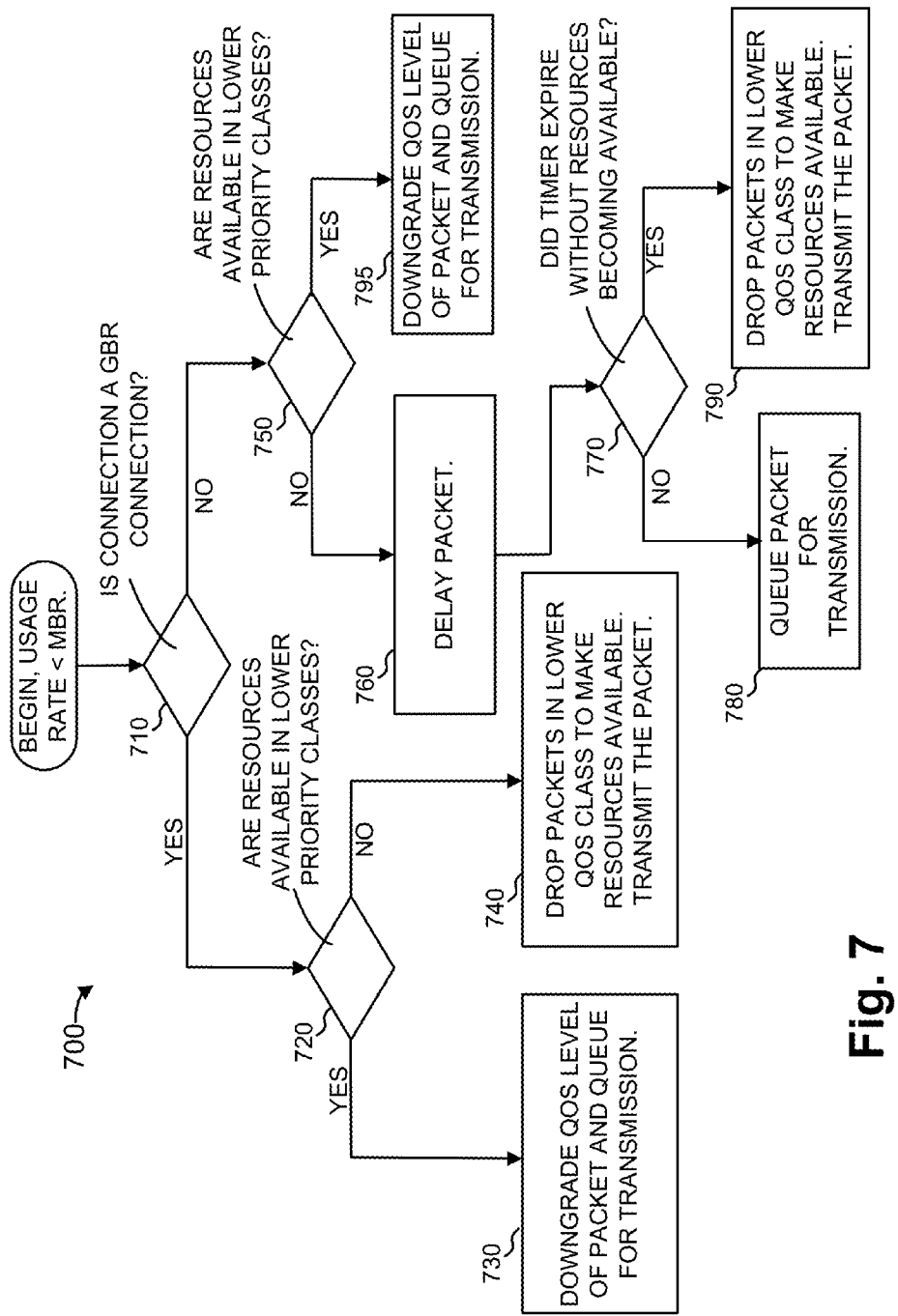

FIG. 7 is a flow chart illustrating an example process 700 for downgrading, dropping, or delaying a packet, as performed in block 530 (FIG. 5). Process 700 may be performed when the UDR of the connection is less than the MBR for the connection. Process 700 may be implemented, for example, by network device 200 using functional components 400.

Process 700 may include determining whether the connection is a GBR connection (block 710). If the connection is a GBR connection (block 710-YES), process 700 may determine whether resources are available in lower priority classes (block 720). When resources are determined to be available in a lower priority class (block 720-YES), process 700 may include downgrading the QoS priority class level of the packet and queuing the packet to one of queues 360 based on the new priority class (block 730).

When resources are determined to not be available in a lower priority class (block 720-NO), process 700 may include dropping packets in a lower QoS class (block 740). This effectively forces resources to be available for the packet. The packet may then be queued for transmission in one of queues 360 in which packets were dropped (block 740). In the situation in which the packet is already in the lowest priority class, the packet may be dropped. In this manner, for a GBR connection in which the connection usage is less than the MBR for the connection, the packet, unless it is in the lowest QoS class, will be transmitted.

Referring back to block 710, the packet may be determined to be a packet for a non-GBR connection (block 710-NO). In this situation, process 700 may include determining if resources are available in a lower priority class (block 750). When resources are determined to be available in a lower priority class (block 750-YES), process 700 may include downgrading the QoS priority class level of the packet and queuing the packet to one of queues 360 based on the new priority class (block 795).

When resources are determined to not be available in a lower priority class (block 750-NO), process 700 may further include delaying the packet (block 760). Delaying the packet, as performed in block 760, may include using a timer to hold the packet for a certain maximum delay interval. Process 700 may include determining whether the timer expired before resources become available (i.e., within the delay interval) (block 770). If resources become available (block 770-NO), the packet may be queued for transmission (block 780). If, however, resources do not become available (block 770-YES), process 700 may include dropping packets in a lower QoS class (block 790). This effectively forces resources to be available for the packet. The packet may then be queued for transmission in one of queues 360 in which packets were dropped (block 790).

In FIGS. 6 and 7, blocks 620, 660, 720, and 750 include determinations of whether resources are available in lower priority classes. Additionally, or alternatively, the determination may include determining if resources are available in one or more higher priority class. If resources are found in a higher priority classes, the packet may potentially be upgraded to that priority class. This implementation can be particularly useful in situations in which users may be dynamically charged based on the network resources that are used.

An action policy function, as described above, determines how to handle overflowing packets in a way the generally minimizes packet loss, packet delay, and degradation of supplied services. Instead of merely dropping overflowing packets, the described APF may take various actions or combinations of actions to minimize disruption of the supplied services, depending on the service type, QoS class, MBR, AMBR, and/or GBR status of the packet. By minimizing packet drop and packet delay when there is congestion in the network, the end-user experience may be improved. Additionally, because different types of connections can be treated differently, real-time applications, such as voice and emergency services, may be given preferential treatment designed to be effective for the type of application. Further, because resources may be allocated from other classes, under-utilization of network resources can be minimized.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 5-7, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device-implemented method, comprising:
    receiving, by the network device, a packet associated with a quality of service priority class and with a connection to a user device, where the network device includes an output queue associated with the priority class of the packet;
    determining, by the network device and when the output queue is congested, whether the connection associated with the packet is a guaranteed bit rate (GBR) connection;
    queuing of the packet, by the network device and in response to the determination, according to a first action policy function when the connection associated with the packet is a GBR connection, wherein the first action policy function includes:
        determining whether resources are available for other priority classes,
        queuing, responsive to determining that the resources are available, the packet to a queue associated with one of the other priority classes, and
        dropping, responsive to determining that the resources are not available, the packet when a usage rate of the GBR connection to the user device is greater than a maximum bit rate value defined for the GBR connection; and
    queuing of the packet, by the network device according to a second action policy function, responsive to a determination that the connection associated with the packet is not a GBR connection,
    wherein the second action policy function includes, when a usage rate of the connection to the user device is greater than a maximum bit rate value defined for the connection:
        determining whether an aggregate usage rate for connections with the user device is greater than a maximum aggregate allowed usage rate, and
        delaying the packet when the aggregate usage rate for the connections with the user device is greater than the maximum aggregate allowed usage rate.

2. The method of claim 1, the first policy action function further comprising:
    determining whether resources are available for other priority classes by determining whether output queues corresponding to priority classes lower than the priority class of the packet are not congested; and
    wherein queuing the packet to the queue associated with the one of the other priority classes includes downgrading a priority class of the packet.

3. The method of claim 1, the first action policy function further comprising, when the resources are determined not to be available for the other priority classes:
    dropping, when a usage rate of the GBR connection to the user device is less than a maximum bit rate value defined for the GBR connection, one or more other packets in one or more priority classes lower than the priority class of the packet, to make resources available for the packet.

4. The method of claim 1, the second action policy function further comprising:
    downgrading a priority class of the packet or delaying the packet when the aggregate usage rate for all connections with the user device is less than the maximum aggregate allowed usage rate.

5. The method of claim 1, the second action policy function further comprising calculating the aggregate usage rate for all the connections with the user device on a per-priority class basis.

6. The method of claim 1, where the second action policy function includes, when a usage rate of the connection to the user device is less than a maximum bit rate value defined for the connection:
    determining whether resources are available for other priority classes by determining whether output queues corresponding to priority classes lower than the priority class of the packet are not congested.

7. The method of claim 6, the second action policy function further comprising:
    downgrading a priority class of the packet or delaying the packet when resources are available to the other priority classes.

8. The method of claim 6, the second action policy function further comprising:
    delaying the packet when resources are not available for the other priority classes.

9. The method of claim 6, where determining whether resources are available for other priority classes includes:
    determining whether output queues corresponding to priority classes lower than or higher than the priority class of the packet are not congested.

10. The method of claim 1, wherein the GBR connection includes a connection formed by a real-time communication application.

11. The method of claim 1, wherein the GBR connection includes a connection to transmit voice data.

12. A network device comprising:
one or more processors; and
one or more memories, coupled to the one or more processors, the one or more memories storing instructions, that when executed by the one or more processors, cause the one or more processors to:
receive a packet associated with a quality of service priority class and with a connection to a user device, wherein the network device includes an output queue associated with the priority class of the packet and wherein the output queue is congested;
determine, in response to the output queue being congested, whether the connection associated with the packet is a guaranteed bit rate (GBR) connection;
determine whether a usage rate of the connection associated with the packet is greater than a maximum bit rate for the connection;
drop the packet or downgrade the priority class of the packet when the connection associated with the packet is determined to be a GBR connection and the usage rate of the GBR connection associated with the packet is determined to be greater than the maximum bit rate for the GBR connection;
delay the packet or downgrade the priority class of the packet when the connection associated with the packet is determined to not be a guaranteed bit rate connection and the usage rate of the connection associated with the packet is determined to be greater than the maximum bit rate for the connection;
drop other packets in lower priority classes or downgrade the priority class of the packet when the connection associated with the packet is determined to be a GBR connection and the usage rate of the GBR connection associated with the packet is determined to be less than the maximum bit rate for the connection;
delay the packet or downgrade the priority class of the packet when the connection associated with the packet is determined to not be a guaranteed bit rate connection and the usage rate of the connection associated with the packet is determined to be less than the maximum bit rate for the connection; and
delay the packet or downgrade the priority class of the packet, when the connection associated with the packet is determined to not be a guaranteed bit rate connection and the usage rate of the connection associated with the packet is determined to be greater than the maximum bit rate for the connection, based on whether an aggregate usage of all connections to the user device is less than a maximum allowed aggregate usage.

13. The network device of claim 12, where the aggregate usage of all connections to the user device is calculated on a per-priority class basis.

14. The network device of claim 12, wherein the one or more memories further cause the one or more processors to:
drop the packet or downgrade the priority class of the packet, when the connection associated with the packet is determined to be a GBR connection and the usage rate of the GBR connection associated with the packet is determined to be greater than the maximum bit rate for the GBR connection, based on whether resources are available for other priority classes.

15. The network device of claim 12, wherein the one or more memories further cause the one or more processors to:
drop other packets in lower priority classes or downgrade the priority class of the packet, when the connection associated with the packet is determined to be a GBR connection and the usage rate of the GBR connection associated with the packet is determined to be less than the maximum bit rate for the GBR connection, based on whether resources are available for other priority classes.

16. The network device of claim 12, where the one or more memories further cause the one or more processors to:
delay the packet or downgrade the priority class of the packet, when the connection associated with the packet is determined to not be a guaranteed bit rate connection and the usage rate of the connection associated with the packet is determined to be less than the maximum bit rate for the connection, based on whether resources are available for other priority classes.

17. The network device of claim 12, where the network device includes a network device in an evolved packet system (EPS) network.

18. The network device of claim 12, wherein the GBR connection includes a connection formed by a real-time communication application.

19. The network device of claim 12, wherein the GBR connection includes a connection to transmit voice data.

20. A device comprising:
one or more processors to receive a packet associated with a quality of service priority class and with a connection to a user device, wherein the network device includes an output queue associated with the priority class of the packet and where the output queue is congested;
one or more processors to determine whether the connection associated with the packet is a guaranteed bit rate (GBR) connection;
one or more processors to queue the packet according to a first action policy function when the connection associated with the packet is a GBR connection, wherein the first action policy function includes:
determining whether resources are available for other priority classes,
queuing, responsive to determining that the resources are available, the packet to a queue associated with one of the other priority classes, and
dropping, responsive to determining that the resources are not available, the packet when a usage rate of the GBR connection to the user device is greater than a maximum bit rate value defined for the GBR connection; and
one or more processors to queue the packet according to a second action policy function when the connection associated with the packet is not a guaranteed bit rate connection, where the first action policy function is different than the second action policy function,
wherein the second action policy function includes, when a usage rate of the connection to the user device is greater than a maximum bit rate value defined for the connection:
determining whether an aggregate usage rate for connections with the user device is greater than a maximum aggregate allowed usage rate, and
delaying the packet when the aggregate usage rate for the connections with the user device is greater than the maximum aggregate allowed usage rate.

* * * * *